(12) United States Patent
Iimura

(10) Patent No.: US 12,367,459 B2
(45) Date of Patent: Jul. 22, 2025

(54) INFORMATION PROCESSING APPARATUS, NON-TRANSITORY COMPUTER READABLE MEDIUM STORING PROGRAM, AND INFORMATION PROCESSING METHOD FOR TRANSFERRING OBJECT BETWEEN PERSONAL AND SHARED WORKSPACES

(71) Applicant: FUJIFILM Business Innovation Corp., Tokyo (JP)

(72) Inventor: Kazuya Iimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 728 days.

(21) Appl. No.: 17/535,670

(22) Filed: Nov. 25, 2021

(65) Prior Publication Data
US 2022/0405710 A1 Dec. 22, 2022

(30) Foreign Application Priority Data
Jun. 22, 2021 (JP) ................ 2021-103539

(51) Int. Cl.
*G06Q 10/10* (2023.01)
*G06F 3/0481* (2022.01)
*G06F 3/14* (2006.01)
*G06F 16/176* (2019.01)

(52) U.S. Cl.
CPC ......... *G06Q 10/103* (2013.01); *G06F 3/0481* (2013.01); *G06F 3/1454* (2013.01); *G06F 16/176* (2019.01)

(58) Field of Classification Search
CPC .... G06F 16/176; G06F 3/0481; G06F 3/1454; G06F 3/0486; G06F 2203/04803; G06Q 10/101; G06Q 10/103
See application file for complete search history.

(56) References Cited

U.S. PATENT DOCUMENTS

| 5,983,277 A * | 11/1999 | Heile | G06F 11/2294 709/215 |
| 8,914,344 B1 * | 12/2014 | Anderson | G06F 8/71 707/704 |
| 2012/0050806 A1 * | 3/2012 | Fukuda | G06F 16/93 358/1.15 |
| 2013/0125051 A1 * | 5/2013 | Kelley | G06F 16/11 715/810 |

(Continued)

FOREIGN PATENT DOCUMENTS

JP 2000267922 9/2000

OTHER PUBLICATIONS

"Office Action of Japan Counterpart Application", issued on Feb. 25, 2025, with English translation thereof, p. 1-p. 4.

*Primary Examiner* — Nicholas Ulrich
(74) *Attorney, Agent, or Firm* — JCIPRNET

(57) ABSTRACT

An information processing apparatus includes a processor configured to provide plural users with a shared workspace for the plural users to share and work on a file, in a case where a condition of allowing use of the shared workspace is satisfied, perform control to display a first button for receiving an instruction to transfer the file to a personal workspace in which the user personally performs work, and in a case where the first button is singly operated by the user, cause the file to be transferred from the shared workspace to the personal workspace.

20 Claims, 6 Drawing Sheets

(56) References Cited

U.S. PATENT DOCUMENTS

| | | | |
|---|---|---|---|
| 2015/0135108 A1* | 5/2015 | Pope | G06F 1/1671 |
| | | | 715/767 |
| 2017/0024100 A1* | 1/2017 | Pieper | H04L 67/01 |
| 2021/0216705 A1* | 7/2021 | Handy Bosma | G06F 40/166 |

* cited by examiner

INFORMATION PROCESSING APPARATUS, NON-TRANSITORY COMPUTER READABLE MEDIUM STORING PROGRAM, AND INFORMATION PROCESSING METHOD FOR TRANSFERRING OBJECT BETWEEN PERSONAL AND SHARED WORKSPACES

CROSS-REFERENCE TO RELATED APPLICATIONS

This application is based on and claims priority under 35 USC 119 from Japanese Patent Application No. 2021-103539 filed Jun. 22, 2021.

BACKGROUND

(i) Technical Field

The present invention relates to an information processing apparatus, a non-transitory computer readable medium storing a program, and an information processing method.

(ii) Related Art

JP2000-267922A discloses a method in which a time limit attribute is set for a file, a folder, and a drive, and, in a case where the current time is within a time limit, an access to the file, the folder, and the drive is not permitted.

SUMMARY

A shared workspace for a plurality of users to share and work on a file may be provided for a user. In this case, for example, a situation such as the passage of time permitted to use the shared workspace occurs, and thus a situation in which it is not possible to use the shared workspace and to continue work performed in the shared workspace may occur. In order to avoid such a situation, it is conceivable that, for example, before the time permitted to use the shared workspace elapses, a file worked by a user in the shared workspace is transferred to an environment that can be used by the user, and the user works on the file in this environment. Such an environment includes, for example, a personal workspace that can be personally used by a user. In this case, the user needs to perform a series of operations of saving a file to be worked in the personal workspace, transferring the file to the personal workspace, and working.

Aspects of non-limiting embodiments of the present disclosure relate to an information processing apparatus, a non-transitory computer readable medium storing a program, and an information processing method for reducing an operation procedure of transferring work performed in a shared workspace to a personal workspace in a case where a condition of allowing use of the shared workspace is satisfied, in comparison to a case where a file performed in the shared workspace is transferred to the personal workspace by an operation other than a single button operation.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: provide a plurality of users with a shared workspace for the plurality of users to share and work on a file, in a case where a condition of allowing use of the shared workspace is satisfied, perform control to display a first button for receiving an instruction to transfer the file to a personal workspace in which the user personally performs work, and in a case where the first button is singly operated by the user, cause the file to be transferred from the shared workspace to the personal workspace.

BRIEF DESCRIPTION OF THE DRAWINGS

Exemplary embodiment(s) of the present invention will be described in detail based on the following figures, wherein.

DETAILED DESCRIPTION

Figure 1:
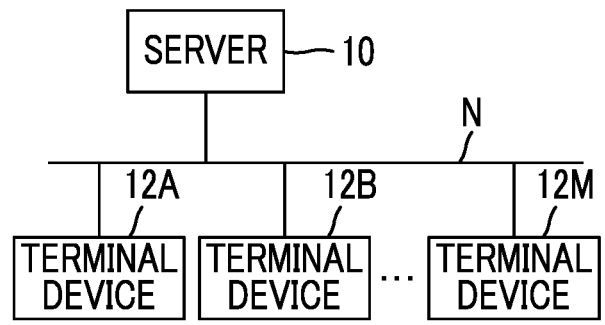
FIG. 1 is a block diagram illustrating a configuration of an information processing system according to an exemplary embodiment.

An information processing system according to an exemplary embodiment will be described with reference to FIG. 1. FIG. 1 illustrates an example of a configuration of the information processing system according to the exemplary embodiment.

The information processing system according to the exemplary embodiment includes a server 10 and terminal devices. In the example illustrated in FIG. 1, the information processing system includes terminal devices 12A, 12B, . . . , 12M, for example. In a case where it is not necessary to distinguish the terminal devices 12A, 12B, . . . , and 12M from each other, it is assumed that the terminal devices 12A, 12B, . . . , and 12M are referred to as a "terminal device 12" below. The number of the servers 10 and the number of the terminal devices 12 illustrated in FIG. 1 are merely an example, and the number of the server 10 and the number of the terminal devices 12 are not limited.

The server 10 and the terminal device 12 have a function of communicating with other devices. The communication may be a wired communication using a cable or a wireless communication. That is, each device may be physically connected to another device by the cable to transmit and receive information, or may transmit and receive information by a wireless communication. A wireless communication includes, for example, a short-range wireless communication, Wi-Fi (registered trademark), and the like. The short-range wireless communication includes, for example, Bluetooth (registered trademark), a radio frequency identifier (RFID), and the like. In the example illustrated in FIG. 1, as an example, each device communicates with another device via a communication path N such as a local area network (LAN) or the Internet.

The server 10 provides a user with a workspace in which the user works. There are two types of workspaces, a shared workspace and a personal workspace. The shared workspace is a space in which a plurality of users share files, folders, and functions to work. The personal workspace is a workspace associated with an individual user, and is a space in which the user works individually. The workspace may be formed on a virtual space, for example. In a case where the shared workspace is used, a screen showing the shared workspace is displayed on the terminal device 12 of a user who uses the shared workspace. In a case where the personal workspace is used, a screen showing the personal workspace is displayed on the terminal device 12 of a user who uses the personal workspace.

The category of the concept of a file includes image data, moving image data, graphic data, sound data such as music data and audio data, document data such as text data, and a program. The format of the file is not particularly limited, and a file having any format may be set as a work target. The format of the file as a work target is limited, and only the file having a specific format may be the work target.

A folder is a place in which a file is stored. For example, there are a shared folder and a personal folder. The shared folder is shared by a plurality of users. The personal folder is associated with an individual user and used by the user individually.

The function is a function related to a process executed for a file or a folder, and a function for realizing another process or operation. The function may be realized by a program such as application software, or may be realized by hardware such as an electronic circuit. For example, application software for viewing and editing document data, image data, and the like being examples of the files, is an example of the function.

In the shared workspace, for example, a plurality of users share a file, a folder, and a function, and perform work such as editing and viewing a file. In the personal workspace, for example, a user associated with the personal workspace performs work such as editing and viewing a file.

Editing a file means changing the contents of the file or information (for example, metadata) attached to the file. Specifically, editing a file includes adding the contents of a file, deleting a portion of the contents, processing the contents, performing processing on a file, changing the name of a file, and the like. For example, in a case where the file is document data, adding a text string to the document data, deleting a portion of the text string from the document data, and changing the color, the font, the size, and the like of the text correspond to an example of editing. In a case where the file is image data, performing image processing (for example, image processing, format conversion, compression, and brightness correction) on the image data corresponds to an example of editing. These are merely examples, and other processing and operations performed by the user may be included in the category of the concept of editing.

The server 10 may have a function other than the function of providing the workspace. The server 10 may function as a file server, a thin client server, a backup server, or the like. The server 10 may be physically one device, or may be configured by a plurality of physically different devices.

The terminal device 12 is, for example, a personal computer (referred to as a "PC" below), a tablet PC, a smartphone, a portable phone, or the like.

Figure 2:
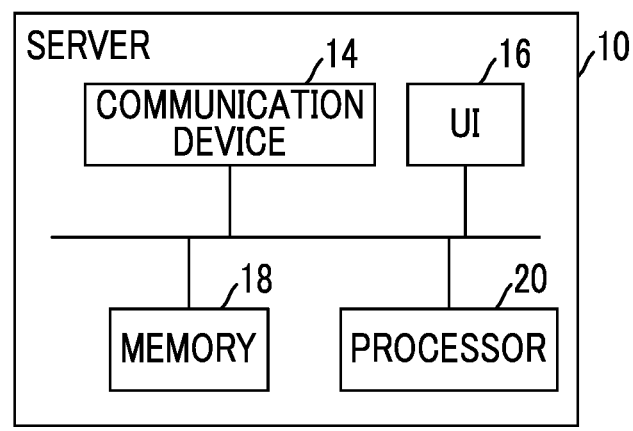
FIG. 2 is a block diagram illustrating a configuration of a server.

The hardware configuration of the server 10 will be described below with reference to FIG. 2. FIG. 2 illustrates an example of the hardware configuration of the server 10.

The server 10 includes, for example, a communication device 14, a UI 16, a memory 18, and a processor 20.

The communication device 14 is a communication interface having a communication chip, a communication circuit, and the like. The communication device has a function of transmitting information to another device and a function of receiving information from the other device. The communication device 14 may have a wireless communication function or a wired communication function. The communication device 14 may communicate with another device by using, for example, short-range wireless communication, or may communicate with another device via the communication path N.

The UI 16 is a user interface and includes at least one of a display or an input device. The display is a liquid crystal display, an EL display, or the like. The input device is a device such as a keyboard or a pointing device (for example, a mouse, a trackball, a touch pad, and a pen tablet). The UI 16 may be a UI such as a touch panel having both the display and the input device. The UI 16 may include a microphone and a speaker.

The memory 18 is a device that forms one or a plurality of storage areas for storing data. Examples of the memory 18 include a hard disk drive (HDD), a solid state drive (SSD), various types of memories (for example, RAM, DRAM, and ROM), other storage devices (for example, optical disk), and a combination thereof. One or a plurality of memories 18 are included in the server 10.

The processor 20 is configured to control the operation of the units in the server 10. The processor 20 may include a memory.

For example, the server 10 realizes a user information storage unit, a shared workspace control unit, a transfer control unit, a display control unit, and a file storage unit.

The user information storage unit and the file storage unit are realized by the memory 18. The user information storage unit stores user identification information for identifying a user. The user identification information is, for example, the name of a user, a user ID, an account, and an e-mail address. For example, the user identification information of a user who uses the workspace is stored in the user information storage unit. Information indicating a user, which is displayed on the shared workspace in a case where the user uses the shared workspace may be stored in the user information storage unit. Such information may be the user identification information. The file storage unit stores a file.

The shared workspace control unit, the transfer control unit, and the display control unit are realized by the processor 20. The memory 18 may be used to realize the shared workspace control unit, the transfer control unit, and the display control unit. The shared workspace control unit controls the display of a file, a folder, and a function in the shared workspace. The transfer control unit controls the transfer between the shared workspace and the personal workspace. For example, the transfer control unit controls the transfer of at least one of files, folders, or functions. The display control unit causes the terminal device 12 to display various types of information. For example, the display control unit causes the terminal device 12 to display a screen showing the shared workspace or a screen showing the personal workspace.

Figure 3:
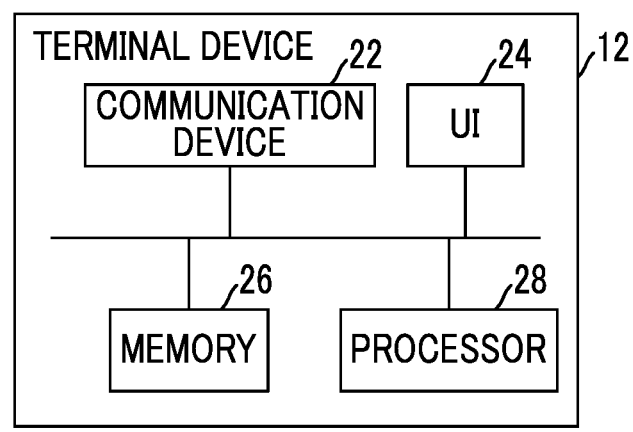
FIG. 3 is a block diagram illustrating a configuration of a terminal device.

The hardware configuration of the terminal device 12 will be described below with reference to FIG. 3. FIG. 3 illustrates an example of the hardware configuration of the terminal device 12.

The terminal device 12 includes, for example, a communication device 22, a UI 24, a memory 26, and a processor 28.

The communication device 22 is a communication interface having a communication chip, a communication circuit, and the like. The communication device has a function of transmitting information to another device and a function of receiving information transmitted from the other device. The communication device 22 may have a wireless communication function or a wired communication function. The communication device 22 may communicate with another device by using, for example, short-range wireless communication, or may communicate with another device via a communication path such as a LAN or the Internet.

The UI 24 is a user interface and includes at least one of a display or an input device. The display is a liquid crystal display, an EL display, or the like. The input device is a device such as a keyboard or a pointing device (for example, a mouse, a trackball, a touch pad, and a pen tablet). The UI 24 may be a UI such as a touch panel having both the display and the input device. The UI 24 may include a microphone and a speaker.

The memory 26 is a device that forms one or a plurality of storage areas for storing data. Examples of the memory 26 include a hard disk drive (HDD), a solid state drive (SSD), various types of memories (for example, RAM, DRAM, and ROM), other storage devices (for example, optical disk), and a combination thereof. One or a plurality of memories 26 are included in the terminal device 12.

The processor 28 is configured to control the operation of the units in the terminal device 12. The processor 28 may include a memory.

In the present exemplary embodiment, the processor 20 in the server 10 provides the user with a shared workspace. For example, the processor 20 provides a shared workspace for a user registered in the shared workspace in advance, a user who has logged in to the shared workspace, and a user permitted to use the shared workspace by an administrator (for example, a person involved in creating or managing the shared workspace). The user may be authenticated in log-in. The processor 20 may form a plurality of different shared workspaces and provide the user with one or a plurality of shared workspaces included in the plurality of formed shared workspaces. A plurality of users who receive the same shared workspace can share and work on a file, a folder, and a function in the shared workspace. For example, the processor 20 causes a screen showing the shared workspace to be displayed on the display of the terminal device 12 of each user who shares the shared workspace. The user can perform work in the shared workspace by using the own terminal device 12.

In addition, the processor 20 provides a personal workspace for a user associated with the personal workspace. For example, the processor 20 causes a screen showing the personal workspace to be displayed on the display of the terminal device 12 of the user associated with the personal workspace. The user can perform work in the personal workspace associated with the user, by using the own terminal device 12. For example, for each user, the personal workspace and the user identification information of the user who uses the personal workspace may be associated with each other and stored in the memory 18 of the server 10. The personal workspace of each user may be managed by the server 10.

In a case where the user transmits an instruction of the transfer to the workspace, the processor 20 may not only cause a transfer target to be transferred, but also switch and display the workspace used by the user from the shared workspace to the personal workspace, or from the personal workspace to the shared workspace.

In addition, a condition (referred to as an "availability condition" below) for permitting the use of the shared workspace is defined. The availability condition is, for example, the time (referred to as an "available time" below) permitted to use the shared workspace, a physical place ("available place" below) permitted to use the shared workspace, and a fee for permitting the use of the shared workspace. For example, space identification information for identifying a shared workspace and condition information indicating the availability condition are associated with each other and stored in the memory 18 of the server 10. In a case where the availability condition is satisfied, the processor 20 provides the user with a shared workspace associated with the availability condition. In a case where the availability condition is satisfied, the user is permitted to work in the shared workspace.

For example, in a case where the available time is defined for the shared workspace, the processor 20 provides the user with the shared workspace within the available time. The user is permitted to work in the shared workspace within the available time. For example, the processor 20 causes a screen showing the shared workspace to be displayed on the display of the terminal device 12 of the user within the available time. The user is permitted to operate the terminal device 12 to work in the shared workspace.

The processor 20 does not provide the user with the shared workspace during time other than the available time. In this case, the user is not permitted to work in the shared workspace during the time other than the available time. For example, during the time other than the available time, the processor 20 may not cause the screen showing the shared workspace to be displayed on the display of the terminal device 12, or may not permit the user to work in the shared workspace while the processor 20 causes the above screen to be displayed on the display of the terminal device 12. The available time may be different or the same for each user.

For example, in a case where a place in which a shared workspace is available is defined, the processor 20 provides the user with the shared workspace within the available place. The user is permitted to work in the shared workspace within the available place. For example, the processor 20 causes the screen showing the shared workspace to be displayed on the display of the terminal device 12 of the user within the available place. The user is permitted to operate the terminal device 12 to work in the shared workspace.

The processor 20 does not provide the user with the shared workspace in a place other than the available place. In this case, the user is not permitted to work in the shared workspace in the place other than the available place. For example, in the place other than the available place, the processor 20 may not cause the screen showing the shared workspace to be displayed on the display of the terminal device 12, or may not permit the user to work in the shared workspace while the processor 20 causes the above screen to be displayed on the display of the terminal device 12. The available place may be different or the same for each user.

For example, position information indicating the position of the terminal device 12 of the user is acquired by a function such as a global positioning system (GPS). In a case where a position indicated by the position information is within the available place associated with the shared workspace, the processor 20 provides the user with the shared workspace and permits the user to use the shared workspace. In a case where the position indicated by the position information is outside the available place associated with the shared workspace, the processor 20 does not provide the user with the shared workspace. The position information may be acquired by a mechanism other than the GPS. For example, the user may input the position information, or may input information regarding a place where the user is (for example, the name of a building, the address, and the name of a district) as the position information.

For example, in a case where an upper limit of the fee is defined for the shared workspace, the processor 20 provides the user with the shared workspace in a case where the use fee of the shared workspace is equal to or smaller than the upper limit, and the processor 20 does not provide the user with the shared workspace in a case where the use fee of the shared workspace is greater than the upper limit. For example, a fee system in which the use fee increases in accordance with the use time of the shared workspace and the number of times of using the shared workspace may be used.

In a case where the availability condition of the shared workspace is not satisfied, the processor 20 transfers a transfer target to the personal workspace associated with the user. The transfer target includes at least one of files, folders, or functions. The transfer target may include one or a plurality of files, one or a plurality of folders, or one or a plurality of functions. In a case where the transfer target includes a folder, files stored in the folder are also included in the transfer target. One or a plurality of files stored in the folder included in the transfer target may be excluded from the transfer target, for example, by an instruction of the user.

In a case where the availability condition of the shared workspace is not satisfied, the processor 20 may automatically transfer the transfer target to the personal workspace even though there is no transfer instruction from the user. In a case where the processor 20 receives a transfer instruction from the user, the processor 20 may transfer the transfer target to the personal workspace.

In a case where the transfer target is transferred to the personal workspace, the user associated with the personal workspace can work with the transfer target in the personal workspace.

For example, in a case where the available time is defined for the shared workspace, the processor 20 transfers the transfer target to the personal workspace during the time other than the available time of the shared workspace. In a case where the available place is defined for the shared workspace, the processor 20 transfers the transfer target to the personal workspace in the place other than the available place of the shared workspace. In a case where the upper limit of the fee is defined for the shared workspace, and the use fee is greater than the upper limit, the processor 20 transfers the transfer target to the personal workspace.

For example, the processor 20 transfers the transfer target from the shared workspace to the personal workspace while leaving the transfer target in the shared workspace. For example, the processor 20 duplicates the transfer target and transfer the duplicated transfer target to the personal workspace. Describing with a specific example, in a case where a file is a transfer target, the processor 20 duplicates the file and transfers the duplicated file to the personal workspace. As another example, the processor 20 may transfer a transfer target to the personal workspace without leaving the transfer target in the shared workspace. The processor 20 may transfer a transfer target from the shared workspace to the personal workspace in a state where a portion of the transfer target is left in the shared workspace and a portion other than the portion is not left in the shared workspace.

In the present exemplary embodiment, in a case where the availability condition of the shared workspace is satisfied, the processor 20 performs control to display a first button for receiving an instruction to transfer a transfer target to the personal workspace. For example, the processor 20 displays the first button on the screen showing the shared workspace. In a case where the first button is singly operated by the user, the processor 20 causes the transfer target to be transferred from the shared workspace to the personal workspace.

The single operation is an operation that completes a transfer instruction by one operation by the user. Examples of a method of the single operation of the first button include clicking the first button, double-clicking the first button, and tapping the first button.

In a case where the availability condition of the shared workspace is satisfied during working in the personal workspace, the processor 20 may display a second button for receiving an instruction to transfer a transfer target in the personal workspace to the shared workspace, for the user. For example, the processor 20 displays the second button on the screen showing the personal workspace. In a case where the second button is operated by the user, the processor 20 causes the transfer target to be transferred from the personal workspace to the shared workspace. The operation of the second button may be a single operation.

The exemplary embodiment will be described below in more detail.

Figure 4:
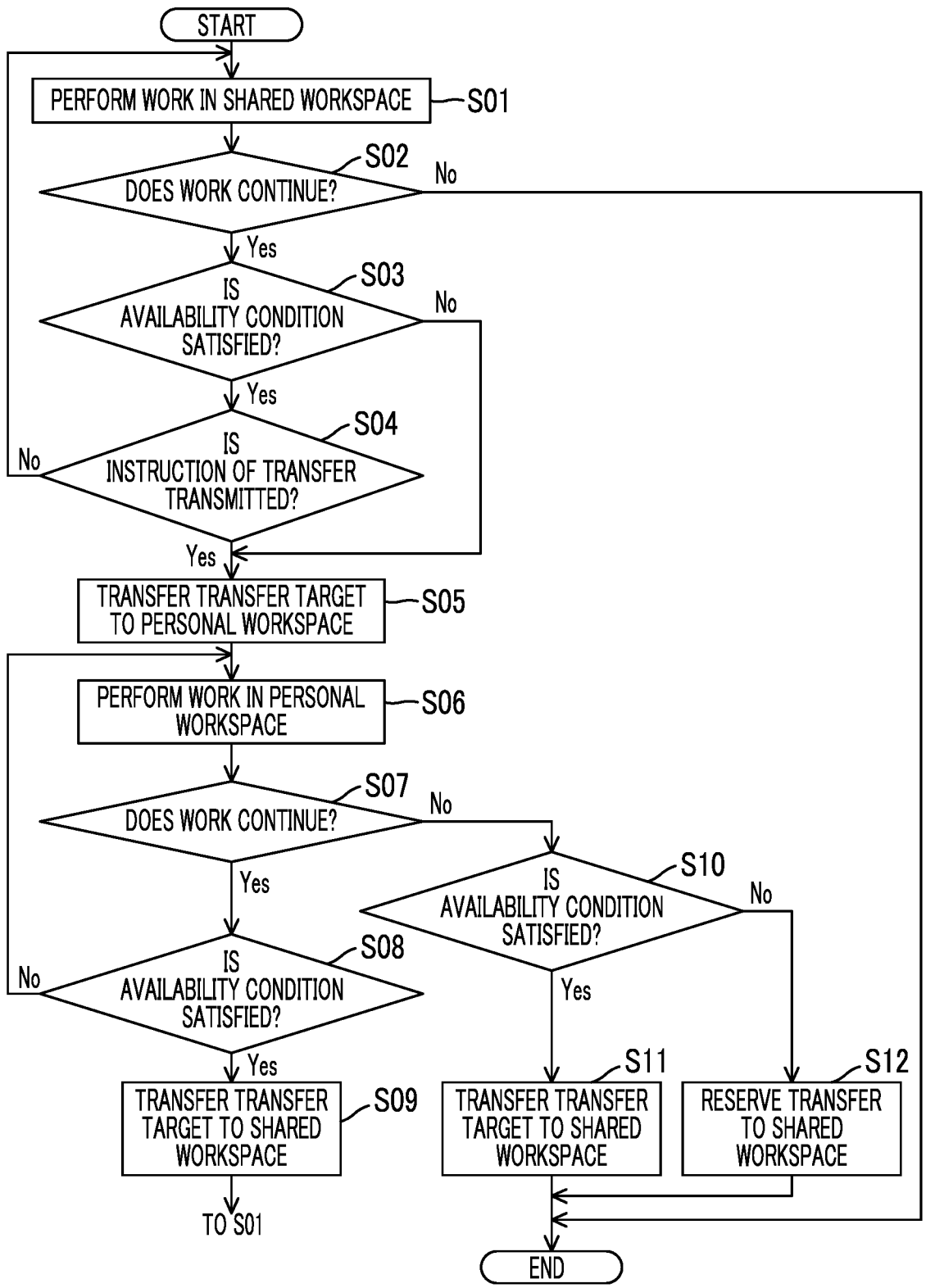
FIG. 4 is a flowchart illustrating a flow of processing according to the exemplary embodiment.

Processing according to the exemplary embodiment will be described with reference to FIG. 4. FIG. 4 is a flowchart illustrating a flow of the processing according to the exemplary embodiment. Here, as an example, a case where a user A works in a shared workspace by using the terminal device 12A of the user A will be described.

First, the user A works in the shared workspace by using the terminal device 12A (S01). For example, the user A accesses the server by using the terminal device 12A, logs in to the shared workspace, and performs work in the shared workspace. Specifically, the processor 20 causes a screen showing the shared workspace to be displayed on the display of the terminal device 12A of the user A. The user A performs work on the screen.

In a case where the user A does not continue the work (S02, No), the process is ended. For example, in a case where the user A issues an instruction to end the work on the screen showing the shared workspace, the processor 20 saves the contents of the work at the time point at which the instruction is received.

In a case where the user A continues the work (S02, Yes), the process proceeds to Step S03. In a case where the availability condition of the shared workspace is satisfied (S03, Yes), and the user A does not transmit an instruction to transfer a transfer target from the shared workspace to the personal workspace associated with the user (S04, No), the process returns to Step S01.

In Step S04, in a case where the user A transmits an instruction to transfer the transfer target (S04, Yes), the processor 20 transfers the transfer target to the personal workspace associated with the user A (S05). For example, in a case where the first button is displayed on the screen showing the shared workspace and the first button is singly operated by the user A, the processor 20 causes the transfer target to be transferred to the personal workspace associated with the user A.

In a case where the availability condition of the shared workspace is not satisfied (S03, No), the processor 20 transfers the transfer target to the personal workspace associated with the user A (S05).

For example, in a case where the available time is defined for the shared workspace and the current time is other than the available time, the processor 20 transfers the transfer target to the personal workspace associated with the user A. In a case where the available place is defined for the shared workspace, and the position of the user is outside the available place, the processor 20 transfers the transfer target to the personal workspace associated with the user A. The similar processing is performed in a case where the upper limit of the fee is defined for the shared workspace.

In a case where the transfer target is transferred to the personal workspace associated with the user A, the user A performs work in the personal workspace associated with the user A (S06). For example, the processor 20 causes the screen showing the personal workspace associated with the user A to be displayed on the display of the terminal device 12 of the user A. The user A performs work on the screen. At this time, the user A can perform the work with the transfer target.

In a case where the user A continues the work (S07, Yes), and the availability condition of the shared workspace used by the user A is satisfied (S08, Yes), the processor 20 switches the workspace from the personal workspace associated with the user A to the shared workspace and provides the user A with the shared workspace. In this case, the processor 20 transfers the transfer target from the personal workspace associated with the user A to the shared workspace (S09). For example, the processor 20 transfers the transfer target that has been transferred from the shared workspace to the personal workspace, from the personal workspace to the shared workspace. The processor 20 may transfer a transfer target selected by the user from the personal workspace to the shared workspace. Then, the process proceeds to Step S01. In a case where the user A transmits an instruction of the transfer, the processor 20 may transfer the transfer target to the shared workspace. Even in a case where the user A does not transmit the transfer instruction, the processor 20 may transfer the transfer target to the shared workspace.

For example, in a case where the available time is defined for the shared workspace, and the current time is within the available time, the processor 20 sets the transfer target in the shared workspace. In a case where the available place is defined for the shared workspace and the position of the user is within the available place, the processor 20 transfers the transfer target to the shared workspace. The similar processing is performed in a case where the upper limit of the fee is defined for the shared workspace.

In a case where the user A continues the work (S07, Yes), the availability condition of the shared workspace is not satisfied (S08, No), the process proceeds to Step S06. In this case, the user A continues the work in the personal workspace associated with the user A.

In a case where the user A does not continue the work (S07, No), the process proceeds to Step S10.

In a case where the availability condition of the shared workspace is satisfied (S10, Yes), the processor 20 transfers the transfer target from the personal workspace associated with the user A to the shared workspace (S11), and ends the process. For example, in a case where the user A issues an instruction to end the work on the screen showing the personal workspace associated with the user A, the processor 20 saves the contents of the work at a time point at which the instruction is received, and transfers a transfer target to which the saved contents are applied, to the shared workspace.

In a case where the availability condition of the shared workspace is not satisfied (S10, No), the processor registers a reservation for transferring a transfer target to the shared workspace in the server 10 in a case where the availability condition is satisfied (S12), and then ends the process. In a case where the availability condition is satisfied, the processor 20 performs the transfer related to the reservation.

The exemplary embodiment will be described below in more detail with reference to specific examples.

A case where users A and B work in the same shared workspace will be described below as an example. For example, the user A logs in to the shared workspace by using a terminal device 12A of the user A and works in the shared workspace. The user B logs in to the shared workspace by using a terminal device 12B of the user B and works in the shared workspace. The users A and B may work in the shared workspace by using the individual terminal devices 12, or may log in to the shared workspace separately by using the same terminal device 12 and work.

The available time being an example of the availability condition is defined for the shared workspace. Along with the available time, the available place and the upper limit of the fee may be defined. As another example, the available time may not be defined, and the available place and the upper limit of the fee may be defined.

Figure 5:
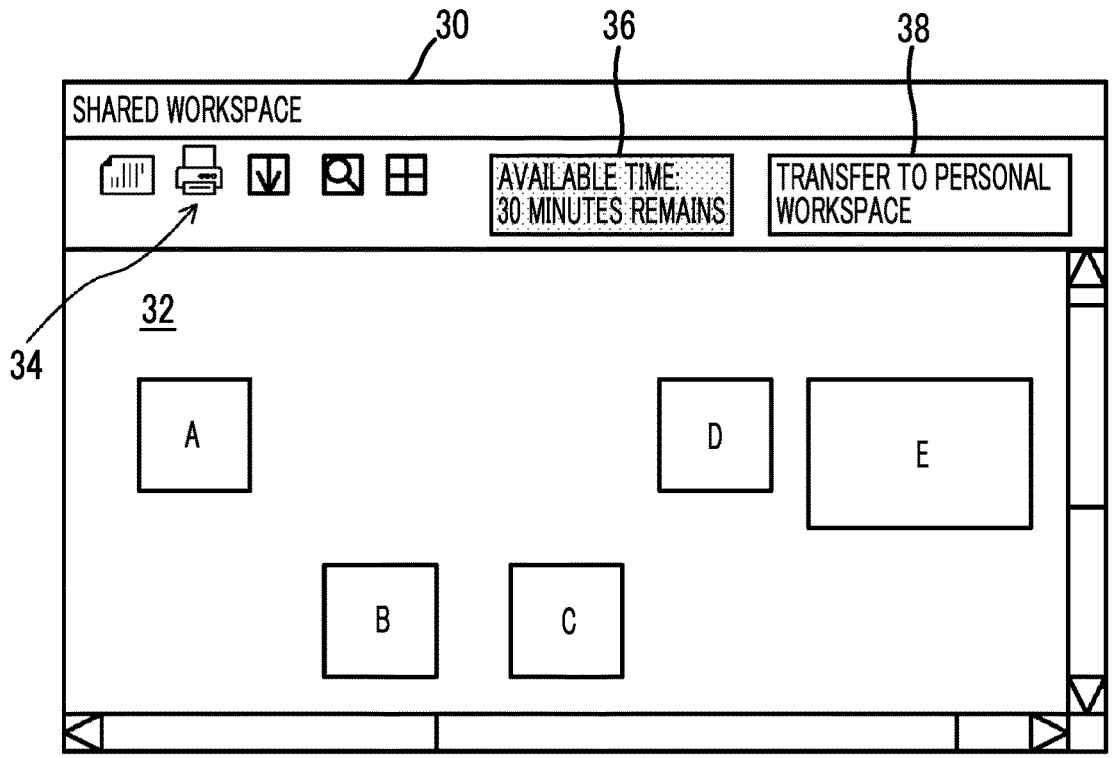
FIG. 5 is a diagram illustrating a screen showing a shared workspace.

FIG. 5 illustrates an example of a screen 30 showing a shared workspace. The processor 20 displays the screen 30 on the respective displays of the terminal devices 12A and 12B.

The screen 30 includes a display area 32 on which files, folders, and the like are displayed. In the example illustrated in FIG. 5, files A, B, C, D, and E are displayed in the display area 32 as an example. For example, an image (for example, an icon representing a file) associated with each of the files A, B, C, D, and E is displayed in the display area 32. In the display area 32, an image (for example, an icon representing a folder) associated with a folder may be displayed, or an image (for example, an icon representing a function) associated with a function of application software or the like may be displayed.

A list 34 of functions is displayed on the screen 30. The list 34 is a list of functions permitted to be used in the shared workspace. For example, the list 34 includes a function to open a file and display the contents of the file, a function to edit a file, a function to print a file, a function to download a file, a function to divide a file, a function to combine files, a function to search for a file, and a function to copy a file. In the example illustrated in FIG. 5, an image (for example, an icon) associated with each function is displayed on the screen 30. The users A and B can work by using the functions included in the list 34. The processor 20 saves the contents of the work. For example, in a case where a file is edited, the file to which the edit is applied is saved.

The available time is defined for the shared workspace, and information indicating the available time is displayed on the screen 30, as indicated by the reference sign 36. In the example illustrated in FIG. 5, information indicating that 30 minutes remains is displayed. The available time may be different or the same for the user A and the user B.

A button 38 for transferring a transfer target is displayed on the screen 30. The button 38 is a button for transferring a transfer target from the shared workspace to the personal workspace. The button 38 is an example of a first button.

For example, in a case where the user A presses the button 38 on the screen 30 displayed on the display of the terminal device 12A, the processor 20 causes a transfer target to be transferred from the shared workspace to the personal workspace, switches the workspace from the shared workspace to the personal workspace, and provides the user A with the personal workspace associated with the user A. In this case, instead of the screen 30, the processor 20 displays a screen showing the personal workspace associated with the user A on the display of the terminal device 12A. In this case, the processor 20 transfers the transfer target to the personal workspace associated with the user A. The user A can work with using the transfer target in the personal workspace associated with the user A. The same is applied to the user B. Here, as an example, in a case where the button 38 is pressed by the user A, the instruction to transfer the transfer target from the shared workspace to the personal workspace is completed. This "pressing" operation is an example of a single operation, for example, clicking, double-clicking, and tapping. The same is applied to the following description.

The processor 20 may change the color of a portion at which the information indicating the remaining time is displayed (that is, the portion indicated by the reference sign 36) in accordance with the remaining time of the available time. For example, in a case where the remaining time is equal to or longer than a threshold value, the processor 20 may display the portion in green. In a case where the remaining time is shorter than the threshold value, the processor 20 may display the portion in red. The processor 20 may set a threshold value more finely and change the color of the portion in accordance with the remaining time.

In a case where the available time is defined for the shared workspace, and the remaining time of the available time is equal to or shorter than the threshold value, the processor 20 may display a warning to the user using the shared workspace. The warning is, for example, a message indicating that the remaining time is equal to or shorter than the threshold value, a message for urging the user to transfer the transfer target from the shared workspace to the personal workspace, and the like. For example, the processor 20 causes a warning to be displayed on the display of the terminal device 12 of the user. Specifically, the processor 20 displays a warning on the screen of the shared workspace displayed on the display of the terminal device 12 of the user.

Figure 6:
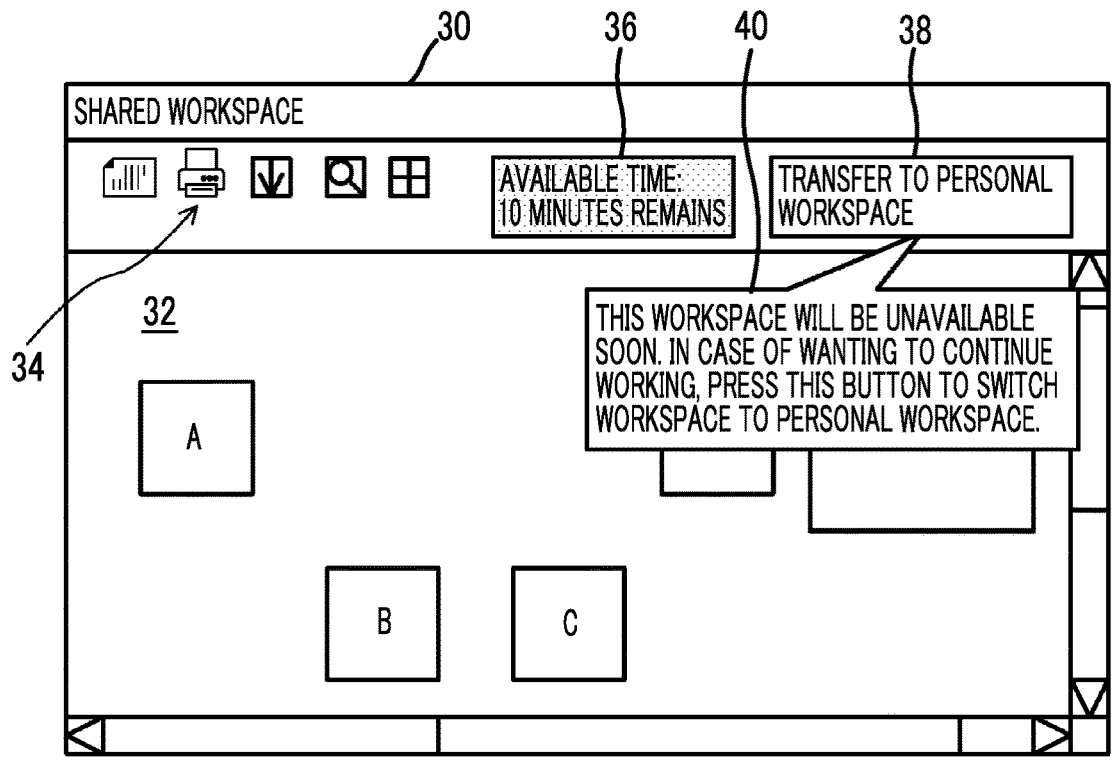
FIG. 6 is a diagram illustrating the screen showing the shared workspace.

FIG. 6 illustrates an example of the warning. For example, the processor 20 displays a warning 40 in the vicinity of the button 38. Specifically, a message having an intention that "this shared workspace will be unavailable soon, thus, in a case of wanting to continue working, we recommend the user to press the button 38 to transfer a transfer target to the personal workspace" is displayed as the warning 40.

The processor 20 may display a warning and/or may generate a sound such as a voice representing the warning from a speaker of the terminal device 12 without displaying the warning.

The processor 20 may change the color of the warning in accordance with the remaining time. In the example illustrated in FIG. 6, the remaining time is 10 minutes as indicated by the reference sign 36, and the color of the portion is displayed in a color different from the color of the portion illustrated in FIG. 5. For example, in a case where the remaining time is shorter than 10 minutes, the portion is displayed in red (see FIG. 6). In a case where the remaining time is equal to or longer than 10 minutes, the portion is displayed in green (see FIG. 5).

In a case where the available place is defined for the shared workspace, in a case where the user A moves from the available place to the outside of the available place, or in a case where the user A is near the boundary of the available place, the processor 20 may display a warning to the user A who is using the shared workspace. The warning is, for example, a message indicating that the user is outside the available place, a message indicating that the place of the user may be outside the available place, and the like.

In a case where the upper limit of the fee is defined for the shared workspace, and the use fee is equal to or greater than the threshold value, the processor 20 may display a warning to the user A who is using the shared workspace. The threshold value is smaller than the upper limit of the fee. The warning is, for example, a message indicating that the use fee is approaching the upper limit.

For example, in a case where the user A presses the button 38, the processor 20 causes the transfer target to be transferred from the shared workspace to the personal workspace associated with the user A. Further, in a case where the current time is out of the available time of the shared workspace, that is, in a case where there is no remaining time of the available time, the processor 20 causes the transfer target to be transferred from the shared workspace to the personal workspace associated with the user A. At this time, the processor 20 switches the workspace from the shared workspace to the personal workspace associated with the user A. The same is applied to the user B.

In a case where the workspace is switched from the shared workspace to the personal workspace, the processor 20 causes the screen showing the personal workspace to be displayed on the display of the terminal device 12. For example, the processor 20 causes the screen showing the personal workspace associated with the user A to be displayed on the terminal device 12A of the user A. Similarly, the processor 20 causes the screen showing the personal workspace associated with the user B to be displayed on the terminal device 12B of the user B.

Figure 7:
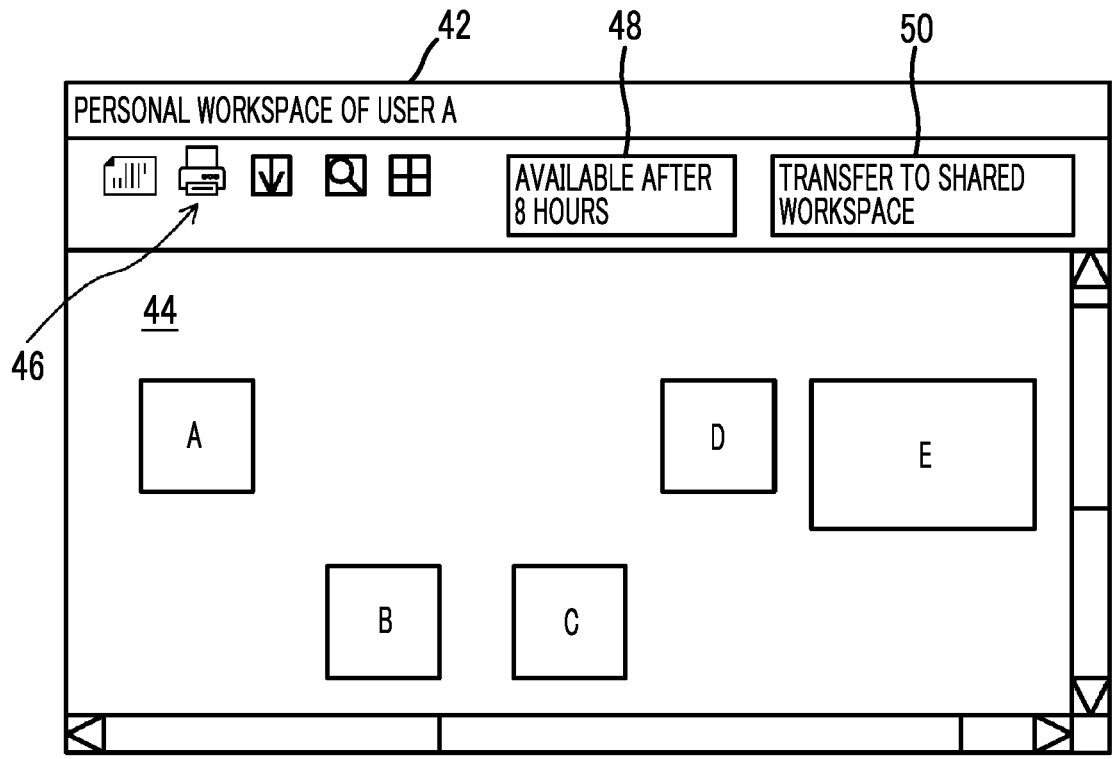
FIG. 7 is a diagram illustrating a screen showing a personal workspace.

FIG. 7 illustrates an example of a screen 42 showing the personal workspace associated with the user A. The current time is outside the available time of the shared workspace, and the workspace is switched from the shared workspace to the personal workspace associated with the user A.

The screen 42 includes a display area 44 on which files, folders, and the like are displayed. In the example illustrated in FIG. 7, files A, B, C, D, and E are displayed in the display area 44 as an example. For example, files A, B, C, D, and E are files included in the transfer target, and are files transferred from the shared workspace to the personal workspace associated with the user A. A file that is not shared by users other than the user A may be displayed in the display area 44. For example, a file created by the user A may be displayed in the display area 44. Folders and functions may be displayed in the display area 44. For example, a folder and a function transferred from the shared workspace to the personal workspace associated with the user A may be displayed in the display area 44. A folder and a function that are not shared by users other than the user A may be displayed in the display area 44.

A list 46 of functions is displayed on the screen 42. The list 46 is a list of functions permitted to be used in the personal workspace. For example, the list 46 includes a function to open a file and display the contents of the file, a function to edit a file, a function to print a file, a function to download a file, a function to divide a file, a function to combine files, a function to search for a file, and a function to copy a file. In the example illustrated in FIG. 7, an image (for example, an icon) associated with each function is displayed on the screen 42. The user A can work by using the functions included in the list 46. The processor 20 saves the contents of the work. For example, in a case where a file is edited, the file to which the edit is applied is saved. The processor 28 of the terminal device 12A may save the contents of the work and the like.

For example, each function included in the list 46 is a function included in the transfer target, and is a function transferred from the shared workspace to the personal workspace associated with the user A. A function that is not shared by users other than the user A may be displayed on the screen 42.

Further, as indicated by the reference sign 48, information indicating the time until the shared workspace can be used is displayed on the screen 42. In the example illustrated in FIG. 7, the shared workspace can be used after 8 hours, and information indicating that the shared workspace can be used after 8 hours is displayed on the screen 42.

A button 50 for transferring a transfer target is displayed on the screen 42. The button 50 is a button for transferring a transfer target from the personal workspace to the shared workspace. The button 50 is an example of a second button.

For example, in a case where the current time is within the available time of the shared workspace, and the user A presses the button 50 on the screen 42 displayed on the display of the terminal device 12A, the processor 20 causes the transfer target to be transferred from the personal workspace to the shared workspace, switches the workspace from the personal workspace to the shared workspace, and provides the user A with the shared workspace. In this case, the processor 20 causes the screen (for example, screen 30) showing the shared workspace to be displayed on the display of the terminal device 12A instead of the screen 42. In this case, the processor 20 causes the contents worked in the personal workspace to be applied in the shared workspace. For example, in a case where a file (for example, file A) transferred from the shared workspace to the personal workspace is edited by the user A in the personal workspace, the processor 20 causes the edit to be applied to the file A on the shared workspace. Here, as an example, in a case where the button 50 is pressed by the user A, the instruction to transfer the transfer target from the personal workspace to the shared workspace is completed. This "pressing" operation may be a single operation. For example, clicking, double-clicking, and tapping are examples of this "pressing" operation. The same is applied to the following description.

The processor 20 may set different background colors, patterns, decorations, and the like of the screens between the shared workspace and the personal workspace. Thus, the user can identify whether the displayed workspace is either the shared workspace or the personal workspace. For example, the processor 20 makes the display area 32 of the shared workspace and the display area 44 of the personal workspace be different in color, pattern, decoration, and the like.

In a case where use of the shared workspace is permitted during working in the personal workspace, the processor 20 may display information such as a message indicating that the use of the shared workspace is permitted, on the screen 42.

The case where the use of the shared workspace is permitted during working in the personal workspace is a case where the availability condition is satisfied, for example, a case where the current time is included in the available time, a case where the position of the user is included in the available place, and a case where the use fee is equal to or smaller than the upper limit.

Figure 8:
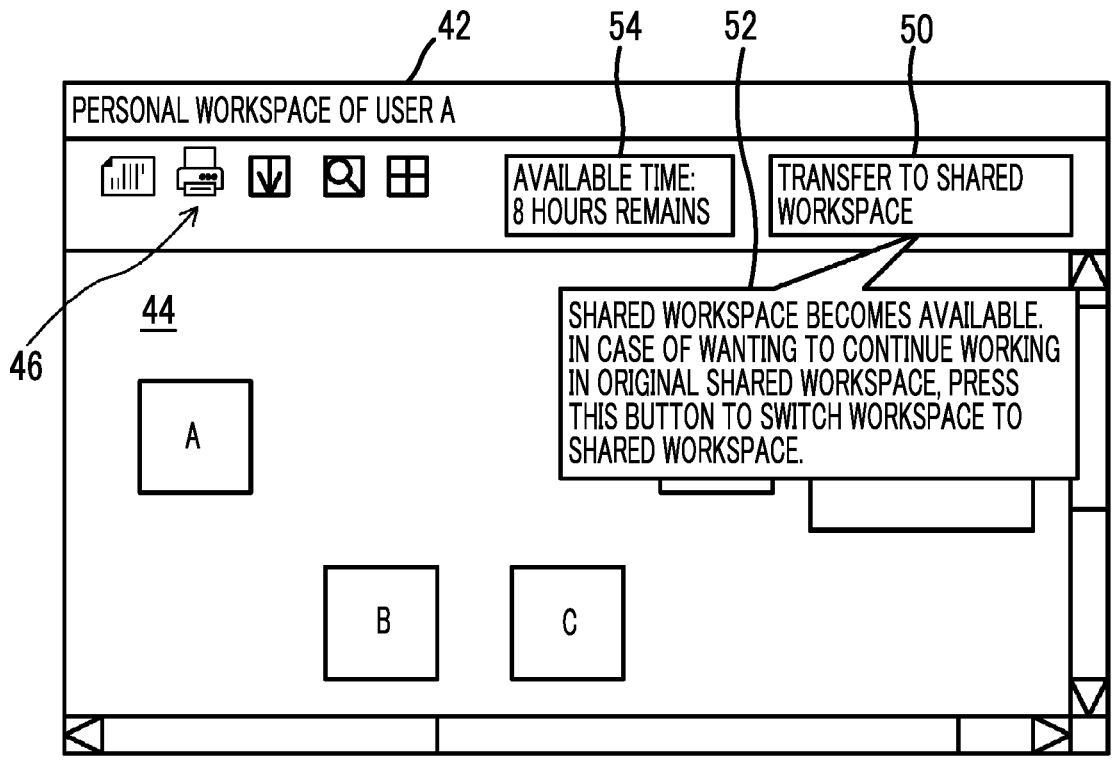
FIG. 8 is a diagram illustrating the screen showing the personal workspace.

For example, in a case where the current time is included in the available time, as illustrated in FIG. 8, the processor 20 displays a message 52 indicating that the use of the shared workspace is permitted, on the screen 42. For example, the message 52 is displayed in the vicinity of the button 50. The message 52 may be displayed in other places. In the example illustrated in FIG. 8, the message 52 having an intention that "the shared workspace is available. In a case of wanting to continue working in the original shared workspace, press this button to transfer the transfer target to the shared workspace" is displayed.

In the example illustrated in FIG. 8, the remaining time of the available time of the shared workspace is 8 hours, and as indicated by the reference sign 54, information indicating the remaining time is displayed on the screen 42.

In a case where the availability condition is not satisfied, the processor 20 does not display the button for transferring the transfer target from the personal workspace to the shared workspace, for the user A. In a case where the availability condition is satisfied, the processor 20 may display the button for transferring the transfer target, for the user A.

For example, in a case where the current time is out of the available time, the processor 20 does not display the button 50 on the screen 42. In a case where the current time is included in the available time, the processor may display the button 50 on the screen 42.

According to the present exemplary embodiment, in a case where the availability condition of the shared workspace is satisfied, and the button 38 being the first button is singly operated by the user, the transfer target is transferred from the shared workspace to the personal workspace associated with the user (see FIGS. 5 to 7). Thus, the operation procedure of transferring the work performed in the shared workspace to the personal workspace is reduced in comparison to a case of transferring the transfer target to the personal workspace by an operation other than the single operation of the first button.

For example, as a technique for transferring the transfer target from the shared workspace to the personal workspace, it is conceivable to perform a series of operations as follows.

As a first series of operations, it is conceivable to perform a series of operations that the user transmits an instruction to simultaneously display both the display area corresponding to the shared workspace and the display area corresponding to the personal workspace on the display, and an individual file displayed in the display area corresponding to the shared workspace is moved to the display area corresponding to the personal workspace by an operation such as drag and drop. In this series of operations, an instruction to display at least two display areas on the display and an operation to move an individual file by an operation such as drag and drop are needed.

As a second series of operations, it is conceivable to perform a series of operations that the user designates a file intended to be transferred, issues an instruction to display a menu showing a list of functions and the like, selects the function of transmitting a file from the displayed menu, and selects a transmission destination (for example, personal workspace) of the file. In this series of operations, it is necessary to designate a file, transmit an instruction to display a menu, select a transmission function, and select a transmission destination.

In comparison to these techniques, in the present exemplary embodiment, the transfer target is transferred to the personal workspace by a single operation of the first button. Thus, operations such as the first series of operations and the second series of operations are not necessary. Therefore, the operation procedure of transferring the work performed in the shared workspace to the personal workspace is reduced in comparison to a case of transferring the transfer target to the personal workspace by an operation other than the single operation of the first button.

The selection of the transfer target will be described below. The transfer target to be transferred from the shared workspace to the personal workspace may be selected by the user or may be selected in accordance with a predetermined condition.

The predetermined condition is, for example, a condition that the work is in progress. For example, in a case where the transfer target is a file being worked on in the shared workspace, and the user A is working on the file A in the shared workspace (for example, in a case where the user views or edits the file A), the processor 20 causes the file A to be included in the transfer target and transfers the file A to the personal workspace associated with the user A who is working on the file A. The same is applied to a case where the folder is being worked on. In a case where a function such as application software is performed in the shared workspace, the processor 20 may cause the function to be included in the transfer target and transfer the function to the personal workspace.

Figure 9:
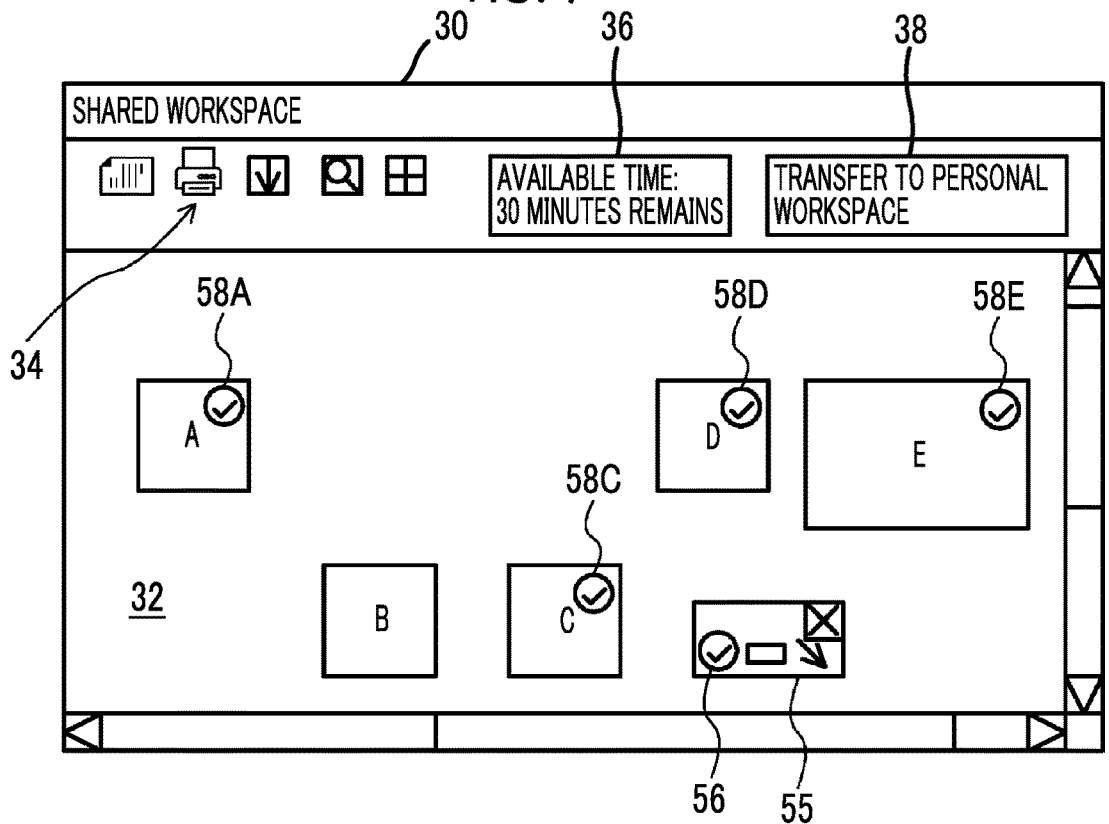
FIG. 9 is a diagram illustrating the screen showing the shared workspace.

The selection of the transfer target will be described below in detail with reference to FIG. 9. FIG. 9 illustrates the screen 30 showing the shared workspace.

For example, in a case where the user A selects a transfer target, the processor 20 adds information (for example, a check mark, a text string, and an image) indicating that the transfer target is transferred to the personal workspace, to the selected transfer target. For example, in a case where the user A selects a file that is an example of the transfer target, the processor 20 adds a check mark or an annotation to the file selected by the user A. The same is applied to a case where a folder or a function is selected as the transfer target.

For example, in a case where the user A transmits an instruction to display a toolbox 55, the processor 20 displays the toolbox 55 on the screen 30. In the toolbox 55, a button 56 indicating a function of adding a check mark to the transfer target is displayed. In a case where the user A presses the button 56 to select a file, a folder, or a function (for example, in a case where the user A clicks or touches a file, a folder, or a function), the processor 20 causes the selected file, folder, or function to be included in the transfer target and transfers the selected file, folder, or function to the personal workspace associated with the user A.

In the example illustrated in FIG. 9, files A, C, D, and E are selected by the user A as the transfer target. A check mark 58A is added to the file A. A check mark 58C is added to the file C. A check mark 58D is added to the file D. A check mark 58E is added to the file E. In a case where the user A presses the button 38 in this state, the processor 20 transfers the files A, C, D, and E to the personal workspace associated with the user A. In a case where the availability condition of the shared workspace is not satisfied, the processor 20 transfers the files A, C, D, and E to the personal workspace associated with the user A.

In a case where the transfer target is selected by the user, the processor 20 may transfer the transfer target only to the personal workspace associated with the user who has selected the transfer target. As another example, the processor 20 may transfer the transfer target to the personal workspace associated with the user who has selected the transfer target and the personal workspace associated with another user who is using the shared workspace with the above user. The processor 20 may transfer the transfer target to the personal workspace associated with another user selected by the user who has selected the transfer target.

For example, the processor 20 may transfer the files A, C, D, and E selected by the user A as the transfer target only to the personal workspace associated with the user A, or to the personal workspace associated with each of the users A and B.

The processor 20 may transfer some of a plurality of transfer targets only to the personal workspace associated with the user who has selected the plurality of transfer targets and transfer others of the plurality of transfer targets to the personal workspace associated with each of the user and other users. For example, the processor 20 may transfer some (for example, file A) of the files A, C, D, and E selected by the user A as the transfer target only to the personal workspace associated with the user A, and may transfer others (for example, files C, D, and E) to the personal workspace associated with each of the users A and B. For example, the user A designates a personal workspace to which the files are to be transferred.

There may be two types of check marks, an exclusive check mark and a shared check mark.

The exclusive check mark is a mark indicating that the transfer target is transferred only to the personal workspace associated with the user (for example, user A) who has selected the transfer target. For example, in a case where a check mark 58A is an exclusive check mark, the processor 20 transfers the file A to only the personal workspace associated with the user A and does not transfer the file A to the personal workspace associated with users other than the user A.

The shared check mark is a mark indicating that the transfer target is transferred to the personal workspace associated with the user (for example, user A) who has selected the transfer target and to the personal workspace associated with another user (for example, user B) who is user other than the user who has selected the transfer target and is using the same shared workspace. For example, in a case where the check mark 58A is a shared check mark, the processor 20 transfers the file A to the personal workspace associated with each of the users A and B.

The user may select a file by selecting either the exclusive check mark or the shared check mark for each file as the transfer target. For example, in a case where the user A adds an exclusive check mark to the file A and a shared check mark to the file B, the processor 20 transfers the files A and B to the personal workspace associated with the user A, and transfers the file B to the personal workspace associated with the user B.

Similarly for folders and functions, a file and a function to which a check mark is added by the user are transferred to the personal workspace as the transfer target. Also in this case, an exclusive check mark and a shared check mark may be used.

The check mark is merely an example of a method of selecting the transfer target. The transfer target may be selected by another method, and it may be displayed that the transfer target has been selected, by another method.

In a case where one user has selected a transfer target, the processor 20 may permit another user to select the transfer target as the transfer target, or may not permit another user to select the transfer target as the transfer target. That is, as the transfer target, there may be a transfer target permitted to be selected as the transfer target by only one user and a transfer target permitted to be selected as the transfer target by a plurality of users.

For example, in a case where the user A selects the file A as the transfer target, the processor 20 may not permit a user (for example, the user B) other than the user A to select the file A as the transfer target. In this case, the file A is transferred only to the personal workspace associated with the user A.

The processor 20 may permit a user other than the user A to select the file A as the transfer target. In this case, in a case where the user B has selected the file A as the transfer target, the processor 20 transfers the file A to the personal workspace associated with each of the users A and B.

A file permitted to be selected as the transfer target only by one user is, for example, a file to be edited. A file permitted to be selected as the transfer target by a plurality of users is a file that is not edited.

The file that is not edited is a file that is prohibited from being edited by the user, such as a display-only file or a viewing-only file. The file to be edited is a file of which the contents are permitted to be changed by the user in addition to being displayed and viewed.

For example, in a case where the file A is a file that is not edited, that is, a display-only file or a viewing-only file, the processor 20 permits only one user to select the file A as the transfer target. In this case, in a case where the user A has selected the file A as the transfer target, the processor 20 does not permit a user (for example, user B) other than the user A to select the file A as the transfer target. The processor 20 transfers the file A only to the personal workspace associated with the user A.

In a case where the file B is a file to be edited, that is, a file permitted to be edited, the processor 20 permits a plurality of users to select the file B as the transfer target. In this case, in a case where each of the users A and B has selected the file B as the transfer target, the processor 20 transfers the file B to the personal workspace associated with each of the users A and B.

A folder or a function may be selected as the transfer target by only one user, or may be selected as the transfer target by a number of users.

The processor 20 may form a specific area in the shared workspace, and transfer the transfer target included in the specific area to the personal workspace. The processor 20 may add a check mark indicating that the transfer target included in the specific area is a transfer target.

Figure 10:
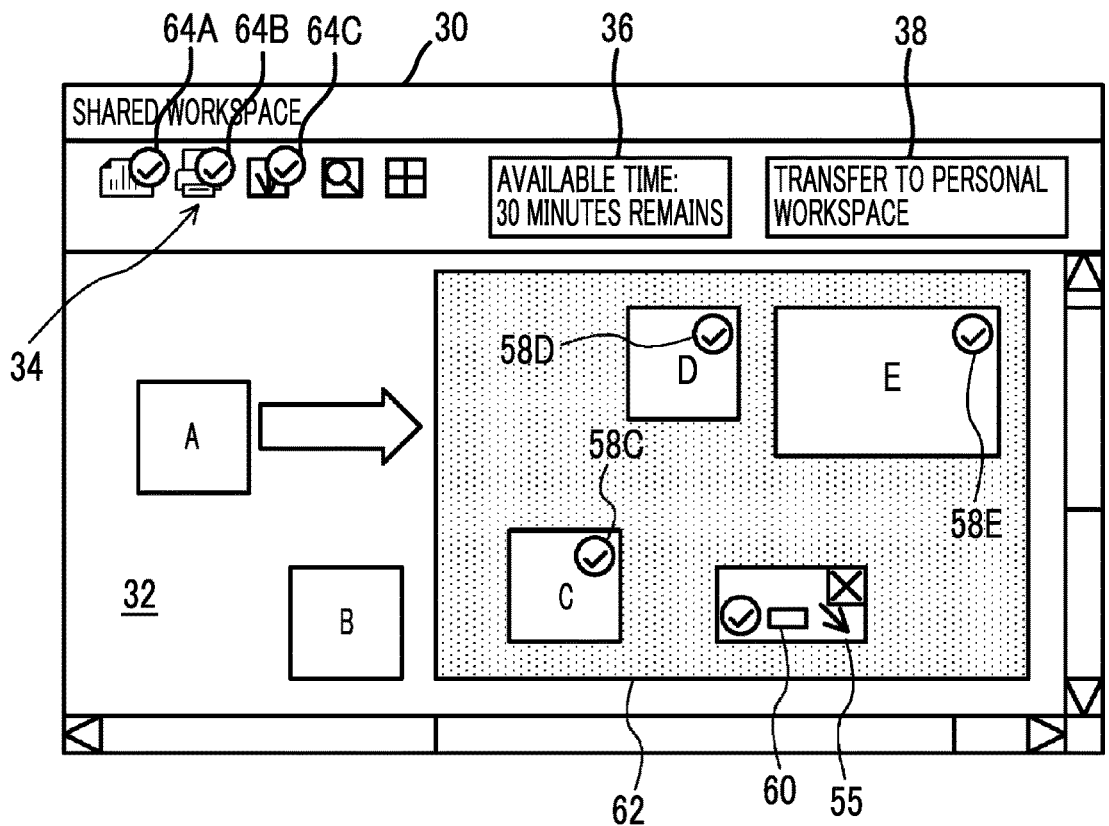
FIG. 10 is a diagram illustrating the screen showing the shared workspace.

The transfer using the specific area will be described below with reference to FIG. 10. FIG. 10 illustrates the screen 30 showing the shared workspace. Here, as an example, it is assumed that the user A performs the transfer operation.

In a case where the user A transmits an instruction to display a toolbox 55, the processor 20 displays the toolbox 55 on the screen 30 as illustrated in FIG. 10. In the toolbox 55, a button 60 representing a function of displaying a specific area is displayed. In a case where the user A presses the button 60, the processor 20 displays the specific area 62 in the display area 32.

The position at which the specific area 62 is displayed, the size of the specific area 62, the shape of the specific area 62, and the number of the specific areas 62 may be designated by the user.

In a case where the user A moves the file into the specific area 62 on the screen 30 (for example, in a case where the file is dragged and dropped into the specific area 62), the processor 20 defines the file as a movement target.

In the example illustrated in FIG. 10, the files C, D, and E are moved into the specific area 62 and defined as the movement target. In this case, a check mark 58C is added to the file C, a check mark 58D is added to the file D, and a check mark 58E is added to the file E.

In a case where the user A moves the file displayed in the specific area 62 to the outside of the specific area 62, the processor 20 excludes the file from the transfer target. In this case, the check mark added to the file is not displayed. For example, in a case where the user A moves the file C to the outside of the specific area 62, the processor 20 removes the file C from the transfer target and hides the check mark 58C.

In the example illustrated in FIG. 10, a plurality of functions included in the list 34 of functions are selected as the transfer targets. A check mark is added to an image representing the function selected as the transfer target. For example, a check mark 64A is added to an image representing a function A (for example, an editing function). A check mark 64B is added to an image representing a function B (for example, a printing function). A check mark 64C is added to an image representing a function C (for example, a downloading function). For example, in a case where the user A selects the image representing each of the functions A, B, and C by clicking or touching, or moves the image representing each of the functions A, B, and C into the specific area 62, the processor 20 defines the functions A, B, and C as the transfer target.

In a case where a folder is moved into the specific area 62, the folder is defined as the transfer target.

In a case where the workspace is switched from the shared workspace to the personal workspace, the files C, D, and E and the functions A, B, and C are transferred to the personal workspace associated with the user A. The user A can work with the files C, D, and E and the functions A, B, and C in the personal workspace associated with the user A.

A specific area may be defined for each user. For example, the processor 20 transfers the transfer target included in a specific area associated with a first user to the personal workspace associated with the first user, and transfers the transfer target included in a specific area associated with a second user to the personal workspace associated with the second user. The first user may move the transfer target into the specific area assigned to the first user, or may move the transfer target into the specific area assigned to the second user. For example, it is conceivable that the first user moves the transfer target into the specific area assigned to the second user in order to hand over the work to the second user.

For example, the specific area 62 is assigned to the user A, and a specific area other than the specific area 62 is assigned to the user B. In this case, the user A may move a file, a folder, or a function being an example of the transfer target into the specific area 62, or may move into another specific area assigned to the user B. The user B may perform the similar operation. The processor 20 transfers the movement target included in the specific area 62 to the personal workspace associated with the user A, and transfers the movement target included in another specific area to the personal workspace associated with the user B.

The specific area 62 may include a plurality of individual areas. For example, the specific area 62 includes a first area and a second area as the individual areas. The first area is an area for transferring the transfer target included in the first area only to the personal workspace associated with a user who has performed an operation (for example, drag and drop) of including the transfer target in the first area. The second area is an area for transferring the transfer target included in the second area to the personal workspace associated with each of the user who has performed the operation of including the transfer target in the second area and other users. The first area corresponds to an example of an exclusive area, and the second area corresponds to an example of a shared area.

For example, in a case where the user A moves the file A into the first area, the processor 20 transfers the file A to the personal workspace associated with the user A. In a case where the user A moves the file A into the second area, the processor 20 transfers the file A to the personal workspace associated with each of the users A and B. The same is applied in a case where the user B performs the operation.

Figure 11:
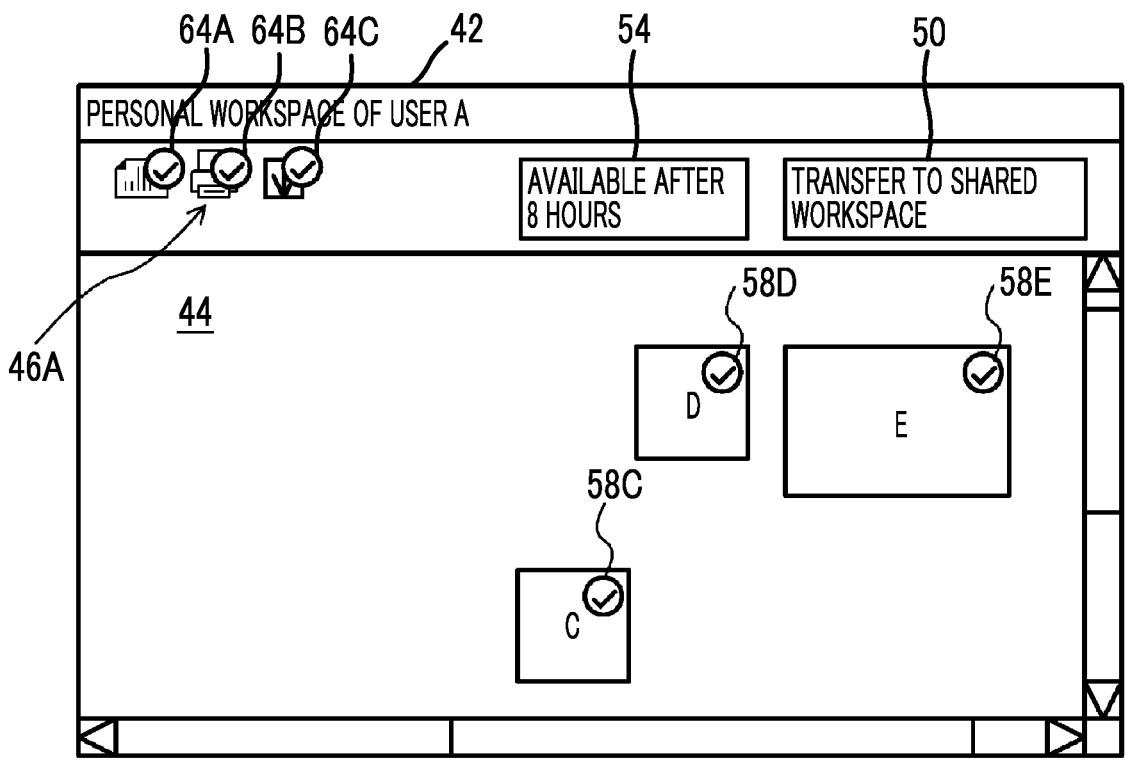
FIG. 11 is a diagram illustrating the screen showing the personal workspace.

FIG. 11 illustrates the screen 42 showing the personal workspace to which the transfer target has been transferred. In the example illustrated in FIG. 10, the files C, D, and E and the functions A, B, and C are selected as the transfer targets, and the files C, D, and E and the functions A, B, and C are transferred to the personal workspace associated with the user A. As a result, as illustrated in FIG. 11, the files C, D, and E are displayed in the display area 44, and a list 46A including the functions A, B, and C is displayed on the screen 42. The check marks 58C, 58D, 58E, 64A, 64B, and 64C may or may not be displayed. The user A can work on the screen 42 with the files C, D, and E and the functions A, B, and C.

In a case where the user ends the work in the personal workspace, and the availability condition of the shared workspace is not satisfied at this time point of the end, the processor 20 may cause a screen (referred to as a "selection screen" below) for causing the user to select a method of applying the contents of the work in the personal workspace to the shared workspace, to be displayed on the display of the terminal device 12 of the user.

Figure 12:
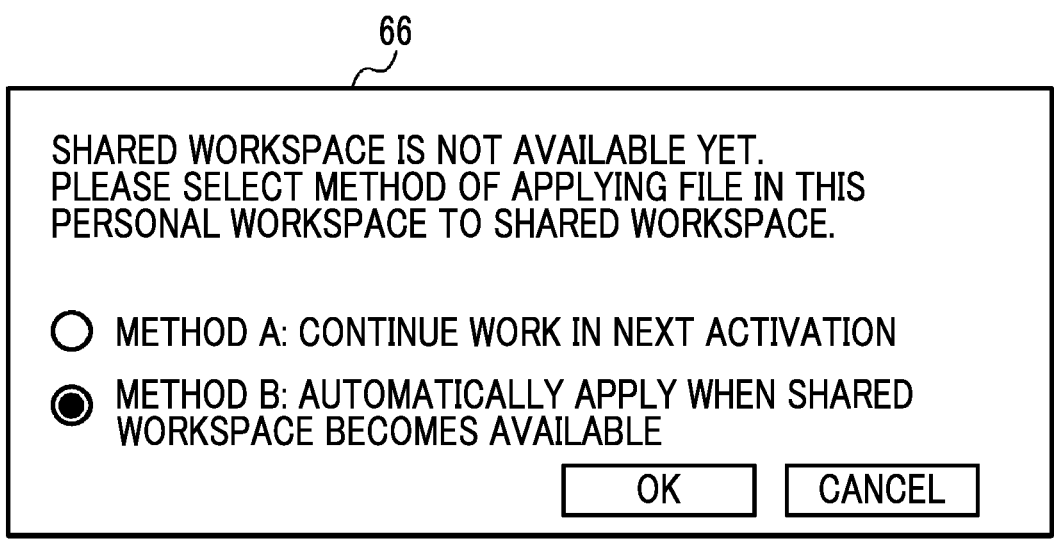
FIG. 12 is a diagram illustrating a selection screen.

FIG. 12 illustrates a selection screen 66. Here, as an example, the available time is defined for the shared workspace. For example, in a case where the user A ends the work in the personal workspace and the end time is outside the available time of the shared workspace, the processor 20 causes the selection screen 66 to be displayed on the display of the terminal device 12 of the user A.

For example, a message indicating that it is not possible to use the shared workspace at the current time point is displayed on the selection screen 66. Further, information indicating the method of applying the contents of the work in the personal workspace associated with the user A to the shared workspace is displayed on the selection screen 66.

For example, information indicating each of methods A and B is displayed on the selection screen 66, and either the method A or the method B is selected by the user. For example, in a case where either the method A or the method B is selected by a check button or the like, and then an "OK button" is pressed, the processor 20 performs the selected method.

The method A is a method in which the contents of the work are not applied in the shared workspace at the end of the work, and the work before the end is continued the next time the work is performed in the personal workspace associated with the user A. In a case where the method A is selected by the user, the contents of the work in the personal workspace are not automatically applied in the shared workspace. For example, even in a case where a file is edited in the personal workspace, the edited content is not automatically applied in the shared workspace.

The method B is a method of automatically applying the contents of the work in the personal workspace to the shared workspace when the shared workspace becomes available.

In a case where the method B is selected by the user, the contents of the work in the personal workspace are automatically applied in the shared workspace. For example, in a case where a file is edited in the personal workspace, the edited content is automatically applied in the shared workspace.

The functions of the units of the server 10 and the terminal device 12 are realized by the cooperation of hardware and software as an example. For example, the processor of each device reads and executes the program stored in the memory of each device to realize the functions of each device. The program is stored in the memory via a recording medium such as a CD or a DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
provide a plurality of users with a shared workspace for the plurality of users to share and perform work on a file in the shared workspace;
in a case where a condition of allowing a use of the shared workspace is satisfied, perform control to display a first button in the shared workspace for receiving an instruction to transfer the file to a personal workspace in which the user personally performs work, wherein the condition of allowing the use of the shared workspace comprises time permitted to use the shared workspace, an available place permitted to use the shared workspace and a fee permitted to use of the shared workspace; and
in a case where the first button in the shared workspace is singly operated by the user, cause the file to be transferred from the shared workspace to the personal workspace.

2. The information processing apparatus according to claim 1, wherein the processor is further configured to:
in a case where a remaining time permitted to use the shared workspace is equal to or shorter than a threshold value, display a warning for the user.

3. The information processing apparatus according to claim 2, wherein the processor is further configured to:
in a case where using the shared workspace is permitted during working in the personal workspace, display a second button for receiving an instruction to transfer a file in the personal workspace to the shared workspace, for the user.

4. The information processing apparatus according to claim 2, wherein the processor is further configured to:
transfer the file being worked on in the shared workspace to the personal workspace associated with the user who is working on the file.

5. The information processing apparatus according to claim 1, wherein the processor is further configured to:
in a case where using the shared workspace is permitted during working in the personal workspace, display a second button for receiving an instruction to transfer a file in the personal workspace to the shared workspace, for the user.

6. The information processing apparatus according to claim 5, wherein the processor is further configured to:
transfer the file being worked on in the shared workspace to the personal workspace associated with the user who is working on the file.

7. The information processing apparatus according to claim 5, wherein the processor is further configured to:
in a case where the second button is operated by the user, cause a file worked on in the personal workspace to be applied in the shared workspace.

8. The information processing apparatus according to claim 1, wherein the processor is further configured to:
transfer the file being worked on in the shared workspace to the personal workspace associated with the user who is working on the file.

9. The information processing apparatus according to claim 1, wherein the processor is further configured to:
transfer a file selected by the user in the shared workspace to the personal workspace associated with the user.

10. The information processing apparatus according to claim 9, wherein the processor is further configured to:
perform control to display information indicating that the file selected by the user is transferred to the personal workspace, on the file selected by the user.

11. The information processing apparatus according to claim 10,
wherein exclusive information and shared information are defined as the information,
the exclusive information indicates that the file is transferred only to the personal workspace associated with the user who has selected the file to be transferred, and
the shared information indicates that the file is transferred to the personal workspace associated with the user who has selected the file to be transferred, and a personal workspace associated with another user.

12. The information processing apparatus according to claim 9, wherein the processor is further configured to:
transfer the selected file only to the personal workspace associated with the user who has selected the file.

13. The information processing apparatus according to claim 9, wherein the processor is configured to:
transfer the selected file to the personal workspace associated with each of the user who has selected the file and another user.

14. The information processing apparatus according to claim 9,
wherein a file to be edited is a file permitted to be selected as a file being a transfer target, by only one user, and a file not to be edited is a file permitted to be selected as a transfer target by a plurality of users.

15. The information processing apparatus according to claim 1, wherein the processor is further configured to:
transfer a file included in a specific area defined in the shared workspace to the personal workspace.

16. The information processing apparatus according to claim 15,
wherein the specific area is defined for each user, and the processor is further configured to:
transfer the file included in the specific area associated with a first user, to the personal workspace associated with the first user, and
transfer the file included in the specific area associated with a second user, to the personal workspace associated with the second user.

17. The information processing apparatus according to claim 15,
wherein the specific area includes a first area and a second area,
the first area is an area for transferring a file included in the first area only to the personal workspace associated with a user who has performed an operation of including the file in the first area, and
the second area is an area for transferring a file included in the second area to the personal workspace associated with each of the user who has performed an operation of including the file in the second area, and another user.

18. The information processing apparatus according to claim 1, wherein the processor is further configured to:
transfer a function selected in the shared workspace to the personal workspace as a function permitted to be used in the personal workspace.

19. A non-transitory computer readable medium storing a program causing a computer to operate to:
provide a plurality of users with a shared workspace for the plurality of users to share and perform work on a file in the shared workspace,
having detected that a condition of allowing a use of the shared workspace is satisfied,
perform, in response to having detected that the condition of allowing the use of the shared workspace is satisfied, control to display a first button in the shared workspace for receiving an instruction to transfer the file to a personal workspace in which the user personally performs work, wherein the condition of allowing the use of the shared workspace comprises time permitted to use the shared workspace, an available place permitted to use the shared workspace and a fee permitted to use of the shared workspace,
having detected that the first button has been singly operated by the user, and
cause, in response to having detected that the first button in the shared workspace is singly operated by the user, the file to be transferred from the shared workspace to the personal workspace.

20. An information processing method comprising:
providing a plurality of users with a shared workspace for the plurality of users to share and perform work on a file;
having detected that a condition of allowing a use of the shared workspace is satisfied;
performing, in response to having detected that the condition of allowing the use of the shared workspace is satisfied, control to display a first button for receiving an instruction to transfer the file to a personal workspace in which the user personally performs work, wherein the condition of allowing the use of the shared workspace comprises time permitted to use the shared workspace, an available place permitted to use the shared workspace and a fee permitted to use of the shared workspace;

having detected that the first button has been singly operated by the user; and cause, in response to having detected that the first button in the shared workspace is singly operated by the user, the file to be transferred from the shared workspace to the personal workspace.

\* \* \* \* \*